United States Patent
Maor et al.

(10) Patent No.: US 10,044,802 B2
(45) Date of Patent: *Aug. 7, 2018

(54) SYSTEM FOR DETECTION OF CONTENT SERVERS AND CACHING POPULAR CONTENT THEREIN

(71) Applicant: c/o QWILT, INC., Wilmington, DE (US)

(72) Inventors: Alon Maor, Shoham (IL); Dan Sahar, Tel Aviv (IL); Gaash Hazan, Kfra Saba (IL); Yoav Gressel, Netaim (IL)

(73) Assignee: Qwilt, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,816

(22) Filed: Jul. 31, 2017

(65) Prior Publication Data

US 2017/0331890 A1    Nov. 16, 2017

Related U.S. Application Data

(63) Continuation of application No. 13/006,785, filed on Jan. 14, 2011, now Pat. No. 9,723,073.

(Continued)

(51) Int. Cl.
*G06F 15/173* (2006.01)
*H04L 29/08* (2006.01)

(52) U.S. Cl.
CPC .... *H04L 67/1095* (2013.01); *H04L 29/08729* (2013.01)

(58) Field of Classification Search
CPC ......... H04L 29/08729; H04L 29/08774; H04L 29/0881; H04L 29/08891; H04L 67/1095;

(Continued)

(56) References Cited

U.S. PATENT DOCUMENTS

| | | | |
|---|---|---|---|
| 5,829,046 A | 10/1998 | Tzelnic et al. | |
| 5,893,140 A | 4/1999 | Vahalia et al. | |

(Continued)

OTHER PUBLICATIONS

Non-Final Office Action dated Sep. 25, 2012 for U.S. Appl. No. 13/006,785.

(Continued)

*Primary Examiner* — Davoud Zand

(74) *Attorney, Agent, or Firm* — M&B IP Analysts, LLC

(57) ABSTRACT

An apparatus comprising a network interface to at least a first portion of a network and at least a second portion of a network. A deep-packet-inspection (DPI) unit identifies at least a source of content, the DPI unit further inspecting one or more packets provided from the identified at least a source of content over the first portion of the network, each packet having at least a specific source address and a specific destination address. A storage stores at least a portion of the content. A content delivery unit receives a request from the second portion of the network for requested content from the identified at least a source of content and responsive thereto provides the requested content, or portions of the requested content, from the storage to the second network if the requested content, or portions of the requested content, is stored in the storage, or otherwise sending the request over the first portion of the network to the identified at least a source of content for the requested content, or missing portions of the requested content.

13 Claims, 4 Drawing Sheets

Related U.S. Application Data

(60) Provisional application No. 61/375,836, filed on Aug. 22, 2010.

(58) Field of Classification Search
CPC ............ H04L 67/1097; H04L 67/2847; H04L 67/2842; H04L 67/2852
USPC ................ 709/223, 224; 714/39, 47.1–47.3; 340/1.1–16.1; 370/252
See application file for complete search history.

(56) References Cited

U.S. PATENT DOCUMENTS

| | | | |
|---|---|---|---|
| 5,933,603 | A | 8/1999 | Vahalia et al. |
| 5,944,789 | A | 8/1999 | Tzelnic et al. |
| 5,948,062 | A | 9/1999 | Tzelnic et al. |
| 6,049,530 | A | 4/2000 | Petersen et al. |
| 6,061,504 | A | 5/2000 | Tzelnic et al. |
| 6,363,413 | B2 | 3/2002 | Kidder |
| 6,700,889 | B1 | 3/2004 | Nun |
| 6,772,193 | B1 | 8/2004 | Igawa et al. |
| 6,799,248 | B2 | 9/2004 | Scherr |
| 6,823,401 | B2 | 11/2004 | Feather et al. |
| 6,831,893 | B1 | 12/2004 | Nun et al. |
| 6,873,600 | B1 | 3/2005 | Duffield et al. |
| 6,985,956 | B2 | 1/2006 | Luke et al. |
| 6,986,018 | B2 | 1/2006 | O'Rourke et al. |
| 7,281,260 | B2 | 10/2007 | Puente et al. |
| 7,310,480 | B2 | 12/2007 | Maciocco et al. |
| 7,349,979 | B1 | 3/2008 | Cieslak et al. |
| 7,436,830 | B2 | 10/2008 | Ben-Nun et al. |
| 7,596,664 | B2 | 9/2009 | Ishikawa et al. |
| 7,606,314 | B2 | 10/2009 | Coleman et al. |
| 7,685,254 | B2 * | 3/2010 | Pandya ............. G06F 17/30985 370/389 |
| 7,697,557 | B2 | 4/2010 | Segel |
| 7,719,966 | B2 | 5/2010 | Luft et al. |
| 7,818,402 | B1 | 10/2010 | Zhang |
| 7,912,921 | B2 | 3/2011 | O'Rourke et al. |
| 7,957,396 | B1 | 6/2011 | Kohn et al. |
| 8,009,682 | B2 | 8/2011 | Gopinath et al. |
| 8,065,559 | B2 | 11/2011 | Kamath et al. |
| 8,607,166 | B2 * | 12/2013 | Jalon .................... G06F 3/0481 715/835 |
| 8,621,101 | B1 | 12/2013 | Starr et al. |
| 8,706,900 | B2 | 4/2014 | Carver et al. |
| 8,737,407 | B2 | 5/2014 | Shetty et al. |
| 8,937,942 | B1 | 1/2015 | Li et al. |
| 2001/0049732 | A1 | 12/2001 | Raciborski et al. |
| 2001/0051980 | A1 | 12/2001 | Raciborski et al. |
| 2002/0006124 | A1 | 1/2002 | Jimenez et al. |
| 2002/0040366 | A1 | 4/2002 | Lahr |
| 2002/0040404 | A1 | 4/2002 | Lahr |
| 2002/0042817 | A1 | 4/2002 | Lahr |
| 2002/0048269 | A1 | 4/2002 | Hong et al. |
| 2002/0062372 | A1 | 5/2002 | Hong et al. |
| 2002/0136204 | A1 | 9/2002 | Chen et al. |
| 2003/0097443 | A1 | 5/2003 | Gillett et al. |
| 2003/0221127 | A1 | 11/2003 | Risan et al. |
| 2004/0128693 | A1 | 7/2004 | Weigand |
| 2004/0133776 | A1 | 7/2004 | Putzolu |
| 2004/0181579 | A1 | 9/2004 | Huck et al. |
| 2005/0015702 | A1 | 1/2005 | Shier et al. |
| 2005/0022237 | A1 | 1/2005 | Nomura |
| 2005/0213514 | A1 | 9/2005 | Su et al. |
| 2005/0289111 | A1 * | 12/2005 | Tribble ............. G06F 17/30038 |
| 2006/0129697 | A1 | 6/2006 | Vange et al. |
| 2006/0168318 | A1 | 7/2006 | Twiss |
| 2006/0224687 | A1 | 10/2006 | Popkin et al. |
| 2006/0271972 | A1 | 11/2006 | Pai et al. |
| 2007/0050686 | A1 | 3/2007 | Keeton et al. |
| 2007/0124781 | A1 | 5/2007 | Casey et al. |
| 2007/0192474 | A1 | 8/2007 | Decasper et al. |
| 2007/0244987 | A1 | 10/2007 | Pedersen et al. |
| 2008/0010381 | A1 | 1/2008 | Barraclough et al. |
| 2008/0307343 | A1 * | 12/2008 | Robert ................ G06F 3/04817 715/765 |
| 2009/0083279 | A1 | 3/2009 | Hasek |
| 2009/0119734 | A1 | 5/2009 | Deshpande et al. |
| 2009/0172565 | A1 | 7/2009 | Jackson et al. |
| 2009/0193129 | A1 | 7/2009 | Agarwal et al. |
| 2009/0307757 | A1 | 12/2009 | Groten |
| 2009/0313437 | A1 | 12/2009 | Sofman et al. |
| 2010/0023726 | A1 | 1/2010 | Aviles |
| 2010/0054257 | A1 | 3/2010 | Dolganow et al. |
| 2010/0082774 | A1 | 4/2010 | Pitts |
| 2010/0115072 | A1 | 5/2010 | Payyappilly et al. |
| 2010/0287227 | A1 | 11/2010 | Goel et al. |
| 2011/0055386 | A1 | 3/2011 | Middleton et al. |
| 2011/0078343 | A1 | 3/2011 | Resch et al. |
| 2011/0107185 | A1 | 5/2011 | Grube et al. |
| 2011/0141887 | A1 | 6/2011 | Klein et al. |
| 2011/0153937 | A1 | 6/2011 | Annamalaisami et al. |
| 2012/0011271 | A1 | 1/2012 | Zhao et al. |
| 2012/0030212 | A1 | 2/2012 | Koopmans et al. |
| 2012/0047224 | A1 | 2/2012 | Shemesh et al. |
| 2012/0047252 | A1 | 2/2012 | Maor et al. |
| 2012/0057460 | A1 * | 3/2012 | Hussain .................. H04L 45/00 370/235 |
| 2012/0084464 | A1 * | 4/2012 | Cochinwala .......... H04L 43/026 709/246 |
| 2012/0117610 | A1 * | 5/2012 | Pandya ............... H04L 63/0485 726/1 |
| 2012/0124618 | A1 * | 5/2012 | Ruiz-Velasco ..... G06Q 30/0241 725/32 |
| 2012/0159329 | A1 | 6/2012 | Chow et al. |
| 2012/0159558 | A1 | 6/2012 | Whyte et al. |
| 2014/0108586 | A1 | 4/2014 | Zhao |
| 2016/0021057 | A1 | 1/2016 | Frost et al. |

OTHER PUBLICATIONS

Non-Final Office Action dated Jul. 26, 2012 in U.S. Appl. No. 13/006,875.

* cited by examiner

SYSTEM FOR DETECTION OF CONTENT SERVERS AND CACHING POPULAR CONTENT THEREIN

This application claims priority from U.S. provisional patent application 61/375,836, entitled "A System for Detection of Content Servers and Caching Popular Content Therein", filed on 22 Aug. 2010, assigned to common assignee and is hereby incorporated by reference for all that it contains.

TECHNICAL FIELD

The disclosed teaching generally relates to classification of packets transmitted in a network and more specifically to the determination of content to be stored in storage located along the network based on the type of data transferred in the packet.

BACKGROUND

Service providers worldwide are facing a mounting problem of flattening revenues coupled with increasing costs brought forth by increasing usage of bandwidth, growing churn, subscriber saturation and competitive price pressures. These mobile and broadband providers are facing challenges in delivering new revenue generating services while seeing their over the top (OTT) counterparts reaping rewards with content delivered over the networks they built and maintained over the years.

The vast majority of these OTT services are delivered over hypertext transfer protocol (HTTP), the de-facto protocol for application development and delivery. Be it video, social networking, search, or advertising, over fixed line as well as mobile applications, it is most likely running on top of HTTP. However, this protocol is also the most processing intensive protocol for network devices. Hence practically any increase in usage results in increase the pressure on the service providers.

Certainly one way to control traffic on the Internet requires various levels of understanding of the traffic that flows through the network which is also increasing in its level of sophistication. Various systems and solutions have been offered to enable deep-packet-inspection (DPI) to enable an ever sophisticated ability to shape the traffic on the network. This ability allows the service providers to better manage the network and its related resources, provide a higher level of quality of service (QoS) in the hopes to increase revenues and profits. However, the rapid increase in the delivery of heavy bandwidth consuming data, such as video, and consumption thereof, requires a new level of handling that is not available today in prior art solutions. A known problem is the access of a user node to a content source and subsequently the access by another user node to the same content, resulting in additional load on the content provider and on the entire network. When, for example, popular video clips are accessed there is a significant and noticeable degradation of the network performance that may even lead to a network failure. Some prior art solutions attempt to store all the data in caches, however, with the huge amounts of data and the need to inspect each and every packet, regardless of its source, makes this a daunting and impractical task.

It would be advantageous to provide service providers with a solution that will enable them to effectively manage and control the delivery of heavy bandwidth consuming data such that the overall bandwidth requirements are loaded and better shared across the network in general, and in particular within the network of a specific service provider.

SUMMARY

To realize some of the advantages discussed above there is provided an apparatus comprising a network interface to at least a first portion of a network and at least a second portion of a network. A deep-packet-inspection (DPI) unit identifies at least a source of content, the DPI unit further inspecting one or more packets provided from the identified at least a source of content over the first portion of the network, each packet having at least a specific source address and a specific destination address. A storage stores at least a portion of the content. A content delivery unit receives a request from the second portion of the network for requested content from the identified at least a source of content and responsive thereto provides the requested content, or portions of the requested content, from the storage to the second network if the requested content, or portions of the requested content, is stored in the storage, or otherwise sending the request over the first portion of the network to the identified at least a source of content for the requested content, or missing portions of the requested content.

Specifically, the identifying of at least a source of content comprises inspection of one out of a predefined portion of packets of packet flows from the traffic on the second portion of the network.

More specifically, the predefined portion is determined by a hash function that uses source addresses and destination addresses of packet flows.

More specifically, the hash function further uses source ports and the destination ports of packet flows.

More specifically, a source of content is considered to be identified once an identification count exceeds a predetermined threshold value.

More specifically, the identification count ages if the count did not increase during a predefined period of time.

Specifically, the content is video.

Specifically, the storing of at least some of the content occurs after inspection of the content of a received data packet provided over the second portion of the network by the DPI unit.

Specifically, the first portion of the network and the second portion of the network are logical partitions of a unified network.

Another aspect of the disclosed teachings is a system of a service provider comprising a network for the delivery of data packets to at least a user node connected to the network. An apparatus having a storage is provided, the apparatus receiving requests over the network from the user node for content, the apparatus providing the content from the storage if the content or portions thereof are found in the storage or otherwise generating a request over the network to a content source coupled to the network.

More specifically, the apparatus comprises a deep-packet-inspection (DPI) unit identifies at least a source of content and thereon inspecting packets provided from the identified at least a source of content over the network. A storage is provided for storing at least some of the content received from the identified at least a source of content. A content delivery unit receives a request for requested content from the identified at least a source of content over the network and responsive thereto provides the requested content, or portions of the requested content, from the storage over the network if the requested content, or portions of the requested content, is stored in the storage, or otherwise sending the request to the identified at least a source of content over the network for the requested content, or missing portions of the requested content.

More specifically, the identifying at least a source of content comprises inspection of one out of a predefined portion of packets of packet flows from the traffic on the network.

More specifically, the predefined portion is determined by a hash function that uses source addresses and destination addresses of packet flows.

Even More specifically, the hash function further uses source ports and destination ports of packet flows.

More specifically, the source of content is considered to be identified once an identification count exceeds a predetermined threshold value.

Even More specifically, the identification count ages if the count did not increase during a predefined period of time.

More specifically, the content is video.

Specifically, the storing of at least some of the content occurs after inspection of the content of a received data packet from the network by the DPI unit.

Another aspect of the disclosed teachings is an apparatus interfacing a first portion of a network and a second portion of a network for performing deep-packet-inspection (DPI) of packets flowing from the first portion of the network to the second portion of the network. The packets carry requested content from at least a content source on the first portion of the network to at least a user node on the second portion of the network responsive to a request for requested content from the user node, The apparatus further stores content determined to be popular content, for delivery of the popular content from the apparatus responsive to a request for the popular content by the at least a user node without a need to send a request for such popular content the at least a content source.

More specifically, a network interface is provided to the first portion of a network and the second portion of a network. A deep-packet-inspection identifies the at least a content source and thereon inspects packets provided from the identified at least a content source over the at least a first portion of the network, each packet having at least a specific source address and a specific destination address. A storage stores at least the popular content. A content delivery unit receives a request over the second portion of the network for requested content from the identified at least a content source and responsive thereto provides the requested content, or portions of the requested content, from the storage over the second portion of the network if the requested content, or portions of the requested content, is stored in the storage, or otherwise sending the request over the first portion of the network to the identified at least a content source for the requested content, or missing portions of the requested content.

More specifically, the first portion of the network and the second portion of the network are logical partitions of a unified network.

Another aspect of the disclosed teachings is an apparatus for automatically analyzing a stream of packets from at least a content source to at least a user node for determination of popular content contained in the packets and to store such content in a storage of the apparatus such that upon a subsequent request from the at least a user node the popular content is provided from the storage transparently to the at least a content source and the at least a user node.

BRIEF DESCRIPTION OF THE DRAWINGS

The above discussed advantages of the disclosed teachings will become more apparent by describing in detail some exemplary implementations thereof with reference to the attached drawings in which.

DETAILED DESCRIPTION

Techniques for efficient usage of network bandwidth are disclosed. Specifically, the disclosed system samples packets from a plurality of content sources and identifies those content sources providing predetermined types of data, for example, video clips. Upon identification of such content sources, any data that arrives from such a content source is subject to a deep-packet-inspection (DPI) process to positively identify the content and the need to store it in cache storage such that when a subsequent request for the same content is received there is no need to transmit the content from the content source and rather deliver it from the system's storage. The result is that at least less traffic goes on the entire network, faster service, and lower operational costs.

Figure 1:
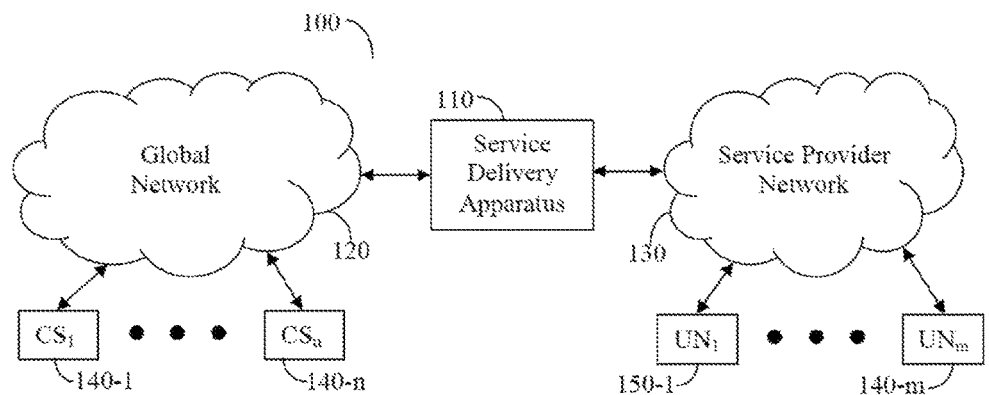
FIG. 1 is a block diagram of an exemplary network system in accordance with certain aspects of the disclosed teachings

Reference is now made to FIG. 1 where an exemplary and non-limiting block diagram 100 of a basic network system in accordance with the disclosed teachings is shown. The system depicted comprises a first portion of a network and a second portion of the network. In this example, the first portion of the network is a global network 120 and the second portion of the network is a service provider network 130. The first and the second portion of the network are coupled by a 'bump-in-the-wire' apparatus 110. While the network 120 and 130 are shown as detached from each other it should be noted that this is only an exemplary configuration and other configurations are possible without departing from the principles of the invention and such separation may be, for example, merely a logical separation. To the global network 120, there are connected one or more content sources (CSs), shown as $CS_1$ 140-1 through $CS_n$ 140-n, commonly referred to as CS 140. The content sources provide content upon request, for example video clips, from the appropriate CS to a requestor. To the service provider network 130 there are connected one or more user nodes (UNs), shown as $UN_1$ 150-1 through $UN_m$ 150-m, commonly referred to as UN 150. When a UN 150 requests content from a CS 140 it is transferred, according to the invention through a service deliver apparatus (SDA) 110, the function of which is described in more detail herein below. Generally, the SDA 110 may provide the requested content from its storage or, when such content, or portions thereof, are not in the SDA 110, then the request is forwarded to the appropriate CS 140 for the delivery of the content, and as further described below.

Figure 2:
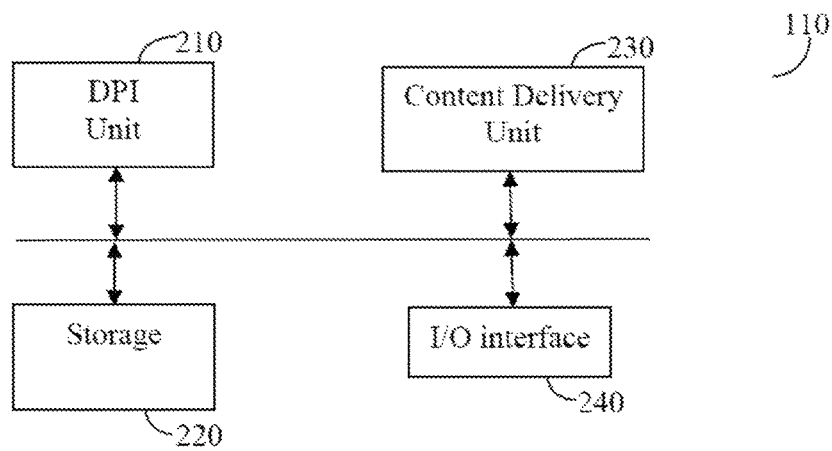
FIG. 2 is a block diagram of an exemplary apparatus to identify content sources and provide content from the apparatus in accordance with the certain aspects of the disclosed teachings

FIG. 2 provides an exemplary and non-limiting block diagram of the SDA 110 that identifies content sources and provides content from the apparatus in accordance with the disclosed teachings. The SDA 110 comprises a DPI unit 210, a storage 220, a content delivery unit (CDU) 230 and an input/output interface 240. According to the disclosed teachings, the DPI unit 210 has two separate tasks. The first task is to identify sources of content that potentially contain data that may be worthwhile to store in storage 220. For example, video servers may be located throughout the global network 120 and accessed by UNs 150 of the service provider network 130, randomly by UNs 150. In order to overcome the deficiencies of related art solutions the apparatus 110 is implemented differently. The DPI unit 210 is provided with data types to look for in data packets that are transmitted through the apparatus 110. Instead of inspecting each and every packet DPI unit 210 may inspect only one in a certain number of (for example, one-in-a-thousand packets) out of the entire traffic thereby significantly lowering the processing load. It should be understood that the method for selecting the sampled packets is typically not performed by using a simple counter to process one out of every predetermined number of packets. Instead the source and destination addresses from each packet are fed into a hash function, and the hash function result is compared to a configurable threshold, and the result of this comparison determines if the packet is inspected or not. In addition, it should be understood that the hash function is symmetric with respect to the source/destination addresses, such that swapping the source address and the destination address does not change the hash result. In one embodiment of the invention source/destination ports may also be used as part of the hash function operation. This is needed to guarantee that each flow comprising of multiple packets sent between a UN 150 and a CS 140 is either fully ignored or fully inspected. Upon determination that a specific CS 140 provides a desired data type, the identification of that CS 140 is stored. Any future packet received from or sent to the identified CS 140 is inspected by the DPI unit 210 and if the packet contains content that may be interesting for storage, such as video content, such content is stored in the storage 220. This kind of inspection ensures that demand for highly popular content from a popular CS 140 is likely to be quickly detected while infrequent access to a CS 140 would typically not impact the traditional operation of the system. It should be noted that identification of a CS 140 does not have to be on the first detection of data of interest and threshold levels may be used, as well as an aging mechanism so that relatively infrequently accessed CSs 140 would lose older accesses from impacting a threshold value.

While DPI unit 210 operates on the packets that arrive from CSs 140, the CDU 230 operates with respect of requests for content received from the UNs 150 of the service provider network 130. Upon receipt of such a request, the DI 210 first checks if content from the requested CS 140 actually resides in the storage 220 by first checking that the CS 140 identification is known to the apparatus 110. If that is the case then the storage 220 is checked for the possibility of delivery of the content or portions thereof. If the entire content or portions thereof are found, then these are delivered to the requesting UN 150. If the entire content is missing, or certain portions thereof are missing, then the request is forwarded to the appropriate CS 140. Storage 220 may be semiconductor media, magnetic media, or any other type of storage media appropriate for the storage of content.

Figure 3:
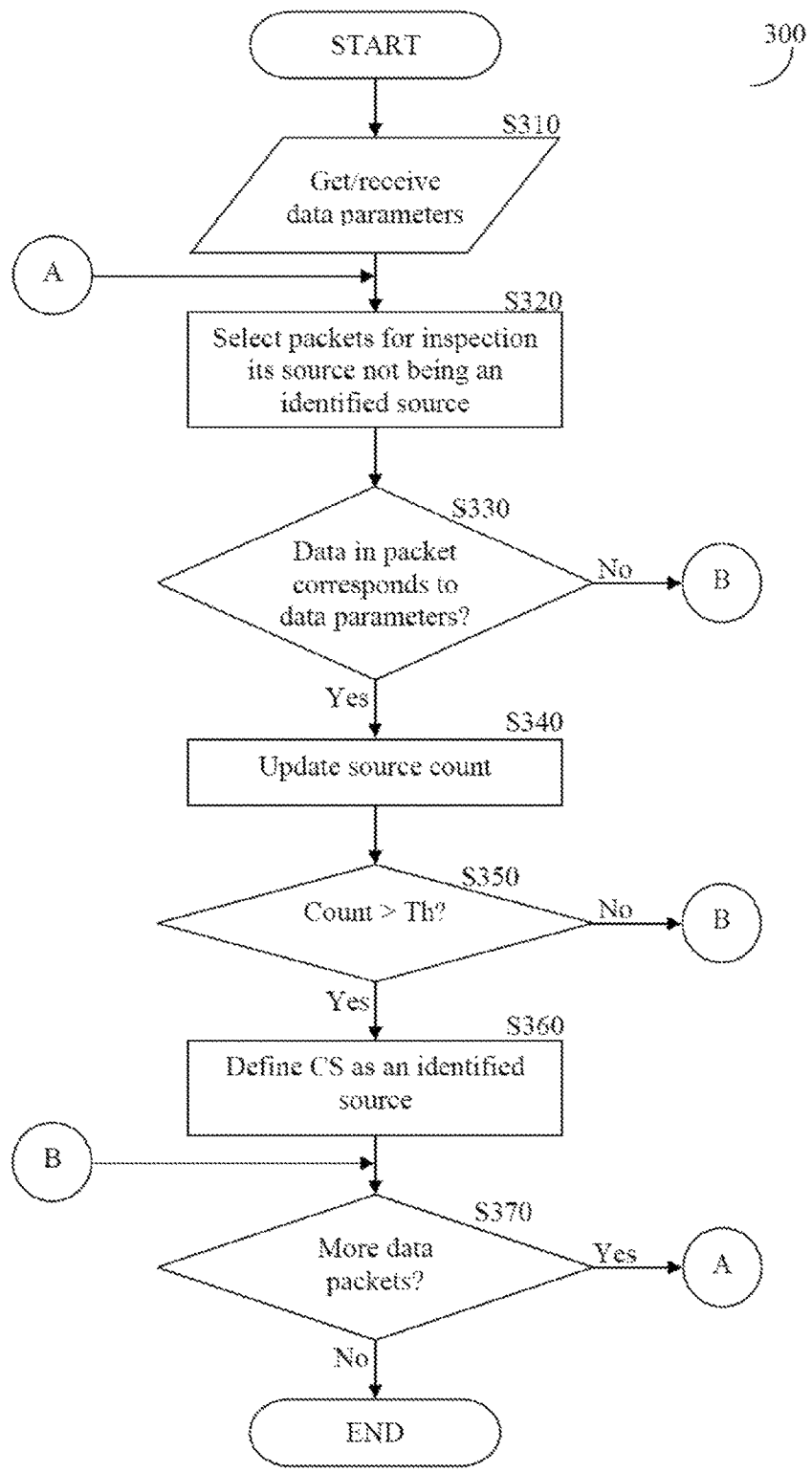
FIG. 3 is a flowchart depicting the identification of a content source in accordance with certain aspects of the disclosed teachings

Reference is now made to FIG. 3 that depicts an exemplary and non-limiting flowchart 300 depicting the identification of a content source in accordance with aspects of the disclosed teachings. In S310 there are received and/or fetched parameters relating to the data of interest in the CSs. For example, it may contain parameters pertaining to video data. In S320, packets are selected off of the network traffic, for example the global network 120. The ratio between the number of packets that pass through the network and the number inspected may be configured, so it could be one-in-a-thousand, one-in-ten-thousand, and so on and so forth. In S330, it is checked if the data in the packet corresponds to the data parameters, e.g., contain video data, and if so execution continues with S340; otherwise, execution continues with S370. In S340, the count with respect to the CS 140 that is the source of the packet is updated, for example but not by way of limitation, by incrementing the value of a counter. In S350, it is checked if the count for that CS 140 has exceeded a threshold value and if so execution continues with S360; otherwise, execution continues with S370. In one implementation, the count may also have an aging mechanism (not shown). Furthermore, different data types may have different thresholds, different count increases, and different count aging. In S360 the CS 140 is identified as a source of content eligible for storage in storage, for example, storage 220. In S370, it is checked if there are more data packets to be inspected and if so, execution continues with S320; otherwise execution terminates.

Figure 4:
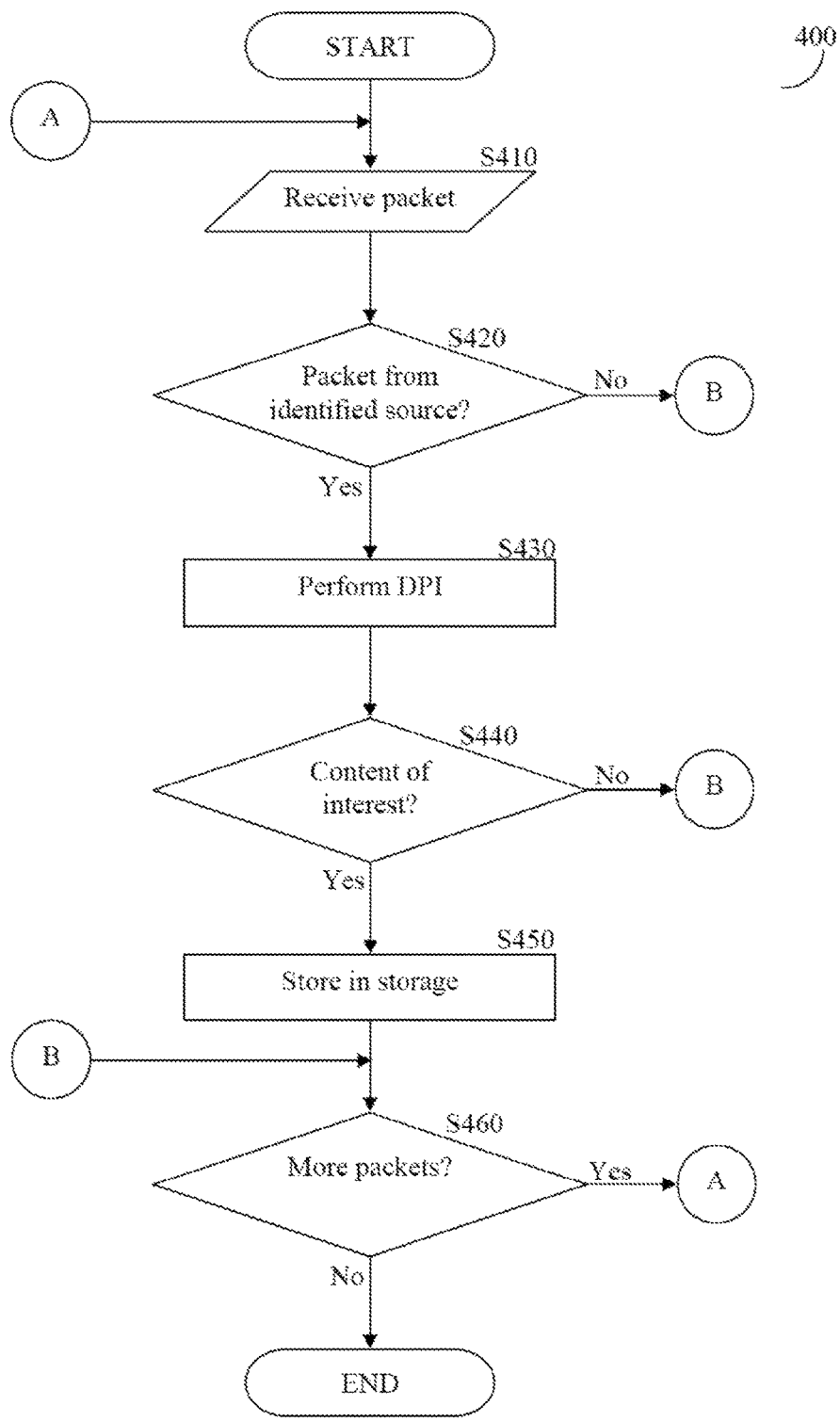
FIG. 4 is a flowchart depicting the storage of content from identified content sources in the storage of the exemplary apparatus

Reference is now made to FIG. 4 that depicts an exemplary and non-limiting flowchart 400 depicting the storage of content from identified CS 140 in the storage 220 of the apparatus 110 according to aspects of the disclosed teachings. In S410, a packet is received by apparatus 110. In S420, it is checked whether the received packet is from an identified CS 140 and if so execution continues with S430; otherwise execution continues with S460. In S430, the received packet is inspected by the DPI unit 210 to identify content of interest. It should be understood that this takes place as it is possible that even though the packet arrived from an identified CS 140 it does not contain content of interest and therefore there is no need to waste valuable storage space in storage 220 for that data. In S440, it is checked whether such content of interest was found and if so execution continues with S450; otherwise, execution continues with S460. In S450 the content from the received packet is stored in storage, for example, storage 220. In S460 it is checked whether more packets are received and if so execution continues with S410; otherwise, execution terminates.

Figure 5:
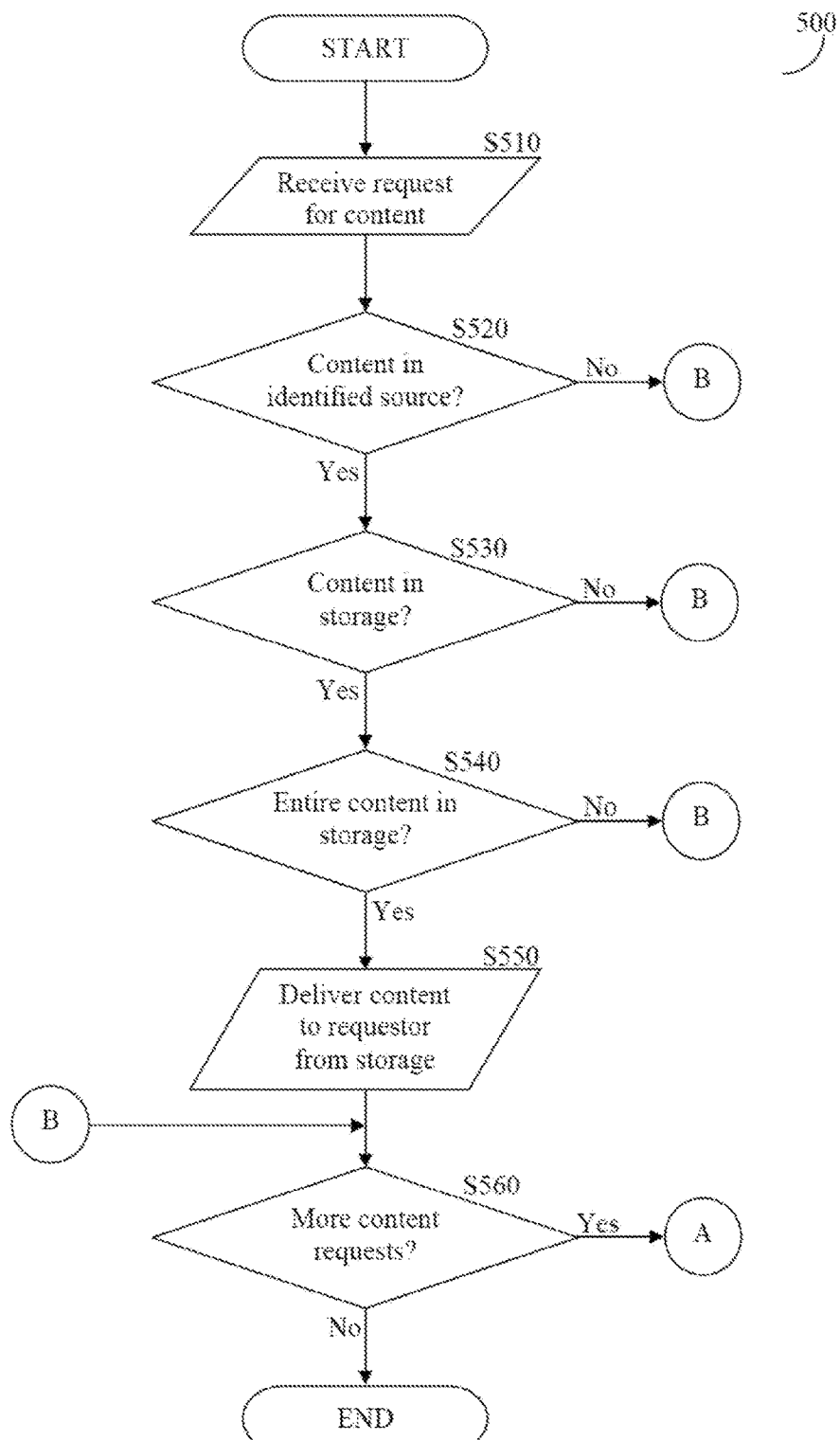
FIG. 5 is a flowchart describing the providing of content to a requesting node according to certain aspects of the disclosed teachings

Reference is now made to FIG. 5 that depicts an exemplary and non-limiting flowchart 500 describing the providing of content to a requesting UN 150 according to aspects of the disclosed teachings. In S510, the apparatus 110 receives a request for content from a UN 150. In S520, it is checked if the requested content is in an indentified CS 140 and if so execution continues with S530; otherwise, execution continues with S560. In S530, it is checked whether the content is in storage, for example storage 220, and if so execution continues with S540; otherwise, execution continues with S560. In S540 it is checked whether the entire requested content is in storage and if so execution continues from S550; otherwise, execution continues with S560. In S550, the content is delivered to the requesting UN 150. In S560, it is checked whether additional content requests exist and if so execution continues with S510; otherwise, execution terminates.

In one alternate implementation, when detecting that a portion of the requested content is in the storage 220 and deliverable to the requesting UN 150, such content is delivered immediately to the UN 150 while only the missing portions of the content is requested from the CS 140. Hence a request from the CDU 230 may be for the requested content or portions thereof. It should be further understood that in a typical implementation, once the DPI unit 210 determines that a CS 140 may contain content that should be stored in storage 220, the packets from such a CS 140 are consistently inspected for determination of popular content.

The disclosed teachings are implemented as hardware, firmware, software, or any combination thereof. Moreover, the software is preferably implemented as an application program tangibly embodied on a program storage unit or non-transitory computer readable medium or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An apparatus, comprising:
   a first network interface configured to couple the apparatus to a first network and a second network interface configured to couple the apparatus to a second network;
   a deep-packet-inspection (DPI) unit, wherein the DPI unit is configured to identify a source of content, wherein the DPI unit is further configured to inspect at least one packet provided to the DPI unit from the identified source of content over the first network;
   a storage for storing at least a portion of the content from the identified source of content, wherein the at least a portion of the content stored in the storage is determined based on the inspection of the at least one packet by the DPI unit; and
   a content delivery unit configured to provide, responsive to a request for the content from the identified source of content, at least a portion of the requested content from the storage.

2. The apparatus of claim 1, wherein the DPI unit is further configured to select the at least one packet from among a plurality of packets from the source of content.

3. The apparatus of claim 2, wherein the at least one packet is selected using a hash function.

4. The apparatus of claim 3, wherein the hash function is symmetric with respect to source addresses and destination addresses.

5. The apparatus of claim 1, wherein the DPI unit is further configured to store the at least a portion of content in the storage when the at least a portion of content is of interest, it is determined, based on the at least one parameter indicating data of interest, whether the inspected at least one packet is of interest.

6. The apparatus of claim 5, wherein the at least one packet is determined to be of interest based on at least one parameter indicating data of interest, wherein the stored at least a portion of content includes the at least one packet of interest.

7. The apparatus of claim 6, wherein the stored at least a portion of content includes popular content.

8. The apparatus of claim 1, wherein the content delivery unit is further configured to request at least one missing portion of the requested content from the identified source of content and to provide the at least one missing portion of content responsive to the request for the content from the identified source of content, wherein the at least one missing portion of content is not stored in the storage.

9. The apparatus of claim 1, each packet having at least a specific source address and a specific destination address.

10. The apparatus of claim 1, wherein the apparatus is connected in a bump-in-the wire configuration between the first network and the second network.

11. The apparatus of claim 1, wherein the first network is a global network and the second network is a service provider network.

12. The apparatus of claim 11, wherein the apparatus is connected in a bump-in-the wire between the first network and the second network.

13. The apparatus of claim 1, wherein the apparatus is a unitary apparatus.

* * * * *